United States Patent
Gniesmer

(10) Patent No.: US 10,359,000 B2
(45) Date of Patent: Jul. 23, 2019

(54) FUNCTIONALLY OPTIMIZED DESIGN OF A CYLINDER LINER

(71) Applicant: KS Kolbenschmidt GmbH, Neckarsulm (DE)

(72) Inventor: Volker Gniesmer, Alfeld (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 121 days.

(21) Appl. No.: 15/709,836

(22) Filed: Sep. 20, 2017

(65) Prior Publication Data

US 2018/0010549 A1    Jan. 11, 2018

Related U.S. Application Data

(63) Continuation of application No. 14/354,673, filed as application No. PCT/EP2012/068040 on Sep. 14, 2012, now abandoned.

(30) Foreign Application Priority Data

Oct. 28, 2011  (DE) .................. 10 2011 085 476

(51) Int. Cl.
  *F02F 1/16* (2006.01)
  *F02F 1/00* (2006.01)
  *F16J 10/04* (2006.01)
  *B21D 53/84* (2006.01)

(52) U.S. Cl.
  CPC ............... *F02F 1/16* (2013.01); *B21D 53/84* (2013.01); *F02F 1/004* (2013.01); *F16J 10/04* (2013.01); *Y10T 29/49272* (2015.01)

(58) Field of Classification Search
  CPC ............... F02F 1/16; F02F 1/004; F16J 10/04
  See application file for complete search history.

(56) References Cited

U.S. PATENT DOCUMENTS

| | | |
|---|---|---|
| 1,819,759 A | 8/1931 | Valletta |
| 5,727,511 A | 3/1998 | Omura et al. |
| 6,044,821 A | 4/2000 | Weng |
| 6,865,807 B2 | 3/2005 | Miyamoto et al. |
| 7,334,546 B2 | 2/2008 | Rasmussen |

(Continued)

FOREIGN PATENT DOCUMENTS

| | | |
|---|---|---|
| CN | 102051570 A | 5/2011 |
| DE | 1975811 U | 12/1967 |

(Continued)

OTHER PUBLICATIONS

International Search Report dated Jan. 17, 2013 for PCT/EP2012/068040.

*Primary Examiner* — Thomas E Lazo
(74) *Attorney, Agent, or Firm* — Young Basile Hanlon & MacFarlane P.C.

(57) ABSTRACT

A cylinder of an internal combustion engine, in which cylinder liner an oscillating piston is guided on a running surface wherein the cylinder line is fixed vertically by means of a collar between a cylinder housing and a cylinder head. The wet cylinder includes an outer side which deviates from a circular shape and/or a rotationally asymmetrical outer contour of the collar. The cylinder liner is fitted in a positionally oriented manner in a corresponding receptable of the cylinder housing.

21 Claims, 3 Drawing Sheets

(56) References Cited

U.S. PATENT DOCUMENTS

| | | | |
|---|---|---|---|
| 7,438,038 B2 * | 10/2008 | Azevedo | ............... F02F 1/163 123/193.2 |
| 7,513,236 B2 | 4/2009 | Miyamoto et al. | |
| 8,640,576 B2 | 2/2014 | Jorg | |
| 2010/0139607 A1 | 6/2010 | Herbst-Dederichs et al. | |

FOREIGN PATENT DOCUMENTS

| | | | | |
|---|---|---|---|---|
| DE | 1751296 A1 | 5/1971 | | |
| DE | 2438762 A1 | 3/1976 | | |
| DE | 19605946 C1 | 7/1997 | | |
| DE | 102004007774 A1 | 9/2005 | | |
| DE | 102006042549 A1 | 3/2008 | | |
| EP | 0217374 A1 | 4/1987 | | |
| GB | 1473756 A | * | 5/1977 | ............... F02F 1/16 |
| GB | 1473756 A | 5/1977 | | |
| JP | S61124772 A | 6/1986 | | |
| JP | S6282261 A | 4/1987 | | |
| JP | H07158504 A | 6/1995 | | |

* cited by examiner

FUNCTIONALLY OPTIMIZED DESIGN OF A CYLINDER LINER

BACKGROUND

The disclosure relates to a cylinder liner for a cylinder of an internal combustion engine The task of the cylinder liner is to minimize wear in its function as a frictional partner to the piston rings, to dissipate the heat of combustion and to improve the mechanical stability of the system during operation while minimizing operationally caused distortion. A distinction is made between wet and dry cylinder liners, depending on their function.

Wet cylinder liners have a collar via which the cylinder liner is fixed in the vertical direction in the engine block, or cylinder housing. The rotationally symmetrical outer contours of the cylinder liner, including the collar, determine a minimum cylinder spacing. Wet cylinder liners are pushed into the cylinder housing into suitably machined seats. Seal rings are used to seal against coolant and oil. Previous wet cylinder liners are normally produced by centrifugal casting and then machined rotationally symmetrically. In the case of wet cylinder liners that are cooled from outside using a coolant, thermal and mechanical stresses can cause cavitation or corrosion damage on the surfaces contacted by the coolant, which can endanger the operation of the engine, depending on its extent. In this cavitation effect, air bubbles formed in the coolant by excitation implode and erode the outside of the liner, where the vibration of the cylinder liner can magnify the erosion.

Dry cylinder liners are pressed, shrunk or cast into the cylinder housing. The water jacket, in contrast to wet cylinder liners, is not located between the liner material and the cylinder housing but is a component of the cylinder housing casting, as with monometallic construction. Dry liners are produced from cast iron, aluminum alloys or as sintered liners from powdered metal materials.

For protection against cavitation, DE 10 2006 042 549 A1 reveals a rotationally symmetrically shaped wet cylinder liner that is given a protective coating on the outside. For this purpose, at least the outer surface areas of the iron-based alloy cylinder liner contacted by the coolant are coated with a thermal sprayed coating.

In order to minimize wear from cavitation it is further known to include additives in the coolant that have a positive effect on the steam pressure of the coolant. The disadvantage is that this measure requires increased maintenance expense to replenish the additives or to check the mixture ratio. A further proposal relates to using cylinder liners of a material with a high module of elasticity, for which a more cost-intensive vermicular graphite cast iron or steel, for example, is proposed as an alternative to cast iron as the material.

DE 196 05 946 C1 reveals a manufacturing process for cylinder liners with which a liner with a thin wall thickness is produced initially to achieve improved wear resistance. A mandrel having an outside diameter corresponding to the inside diameter of the cylinder liner to be produced is used as the mold, and a sprayed material of the desired thickness is applied to the outer peripheral surface of the rotating mandrel, using a known thermal spraying process. Then the liner on the mandrel can be ground and shaped if necessary. After being removed from the mandrel, the liner is machined on its end faces if this is required.

The cylinder liner from DE 195 78 11 A1 consists of two different materials. A liner insert of cast iron is surrounded on the outside by a carrier cylinder made of steel. This known concept using two components arranged concentrically to each other involves high manufacturing costs and, therefore, for economic reasons is not considered for use in series mass production.

SUMMARY

It would be desirable to provide a functionally optimized cylinder liner that allows improved protection against cavitation, increased strength and optimized installation space for its environment. It is further desirable to provide a method using which any external contour can be created for the cylinder liner.

Starting from the prior art already cited, the present cylinder liner and method of making the same provides measures to create a functionally optimized cylinder liner. The method further includes a process for shaping the cylinder liner outer contour.

The disclosed measures to implement a functionally optimized wet cylinder liner relate to the outer design of a cylinder liner and can be applied individually or together. Instead of a rotationally symmetrical design for the outside or lateral surface of the cylinder liner, the cylinder liner and method provides for configuring areas that are subject to a high risk of cavitation rotationally asymmetrically. A lateral surface that deviates from a circular shape makes it advantageously possible to reinforce vulnerable areas of the cylinder liner and thereby to provide a cylinder liner that is protected permanently and reliably against coolant-induced cavitation and corrosion damage. The outside of the cylinder liner forms a rotationally asymmetrical geometry except for the seat in the crankcase or cylinder housing and the sealing element zones. Advantageously, the outer contour of the collar of the cylinder liner can furthermore be off-round or free form. Since the width of the collar essentially determines axial spacing between adjacent cylinder liners in the assembled state, an off-round outer area of the collar can selectively reduce the collar width along a longitudinal axis of the internal combustion engine and therewith also spacing between adjacent cylinder liners. The geometric asymmetries permit a shortened block length for the cylinder housing and consequently realization of an advantageously design space-optimized internal combustion engine. In the installed position, the functionally optimized cylinder liner is a positive fit: position-oriented and aligned in a matched seat in the cylinder or cylinder housing that forms a counter shape. Thus, solutions are demonstrated whereby the susceptibility of or damage to the cylinder liner from cavitation, corrosion or erosion is reduced and the service life of the liners can be improved. Linked to this, the service life and reliability of the internal combustion engine equipped with such liners is increased.

A composite cylinder liner consisting of at least two different materials is also disclosed. This construction can be used to produce a wet cylinder liner as well as a dry or cast-in cylinder liner. In the axial direction, the liner forms at least two sections that are materially joined, such as by using friction welding. This design construction that can be implemented cost effectively preserves freedom in the choice of liner material for individual sections of the liner. For example, a selective increase in strength can be achieved by using a material of greater strength and/or temperature resistance for the section of the collar that includes a flute. The adjoining section of the liner containing the running surface of the cylinder liner can be produced from a material that, for example, contains a potential for self-lubrication in the solid-body contact area/mixed friction area or allows a lubricating film to be formed by means of oil pockets. This construction further permits provision of locally reduced wall thicknesses in the liner to optimize cooling. The use of materials with a lesser thickness is suitable as a measure to reduce the weight of the cylinder liner. The design principle for wet liners additionally offers the opportunity of using materials with positive cavitation characteristics or a higher modulus of elasticity for high-risk sections or zones of the liner to improve deformation characteristics. A further measure to minimize wear can be found in pairings of materials to reduce interparticle wear in the contact area of the piston rings on the running surface, particularly at the top and bottom dead centers of the piston, or the ring reversal points. To this end, for example, the section of the liner in which the piston is guided can be made of a wear-resistant material. When using the liner concept consisting of different materials for a cast-in, dry cylinder liner, it may be appropriate to optimize the manufacturing process advantageously by selecting liner materials that improve a bond to the material of the cylinder block or cylinder housing. With an optimally matched material combination, a cylinder liner may be optimally realized that combines complex functions of a wet and dry cylinder liner with respect to mechanics, tribology on the inside, for example, friction, lubrication and wear, and the cavitation of a wet liner on the outside.

In one aspect, provision is made for the outside or lateral surface of the cylinder liner and/or the outer contour of the collar to have a geometry deviating from a circular form, in elliptical or oval in shape. In particular for the collar of the cylinder liner, an elliptical or oval shape is appropriate that may include additional double, triple or multiple overlaid oval shapes. In addition, the collar may be carried out in the shape of any kind of prism-shaped free form or as a splined surface.

Another aspect makes provision for a directional installation position of the cylinder liner in which the areas of the cylinder liner aligned towards a pressure side and a counter-pressure side have wall thicknesses or collar widths that exceed corresponding wall thicknesses and/or collar widths that are aligned in the direction of the piston pin or the direction of a longitudinal axis of the cylinder block. The resulting support surface of the liner collar is designed in total to prevent acceptable surface pressures during operation of the internal combustion engine from being exceeded. The required surface profile can be realized using the off-round, such as oval, support or contact surface. This design principle provides the opportunity to offer different engine displacements with the same cylinder housing by using appropriate cylinder liners with different cylinder bores.

In a further aspect, in order to optimize the cost of the cylinder liner, provision is made for a contact/runningsurface for the piston in an area below bottom dead center (BDC) of the piston to be restricted to zones that are aligned in the direction of the pressure side and counter-pressure side. This running surface geometry, in which there is no machining towards the piston pin (for example because the liner is set back there), is particularly suitable for internal combustion engines with window pistons. Furthermore, to reduce weight, the liner can, for example, be left partially open by means of windows or recesses. Mechanical or thermal means of separation can be used to realize these open areas, or, alternatively, recesses can already be present in the casting blank.

A further measure provides for a coating on the outside of the cylinder liner. To create a cavitation-resistant surface at least the area of the liner consisting of a cast-iron alloy is coated completely all the way round or partially in the area of the pressure side and the counter-pressure side, specifically with a thermal spray coat.

An oval turning or off-round turning method is provided to create almost any geometrically shaped topographies on the outer contour of the cylinder liner. These methods, which can be employed with short process times, are suitable for creating the rotational asymmetrically shaped outside and/or the outside contour. Oval or off-round turning advantageously allows great design freedom regarding the alignment, the progression and the size of free-form surfaces or contours. An advantage is that there is no limit regarding the geometric shape. These methods can be used both for lateral surfaces, the skirt, the outer surface and the collar of the cylinder liner. One advantage is that good reproducibility is achieved in one step at the same time as extreme dimensional accuracy and high surface quality.

Production of the cylinder liner, which includes oval or off-round turning to remove material from local areas on the cylinder liner, comprises the following steps. First, through a primary forming process, such as casting or forging, the production of the single-piece blank or section blanks takes place. Then the sections are joined using a material bonding connection. The next step is performed using mechanical operations, oval or off-round turning, the external machining of the outside and/or the outer contour of the cylinder liner, to create any geometrically shaped surfaces or contours. Then the inner running surface is created before the cylinder liner is cleaned of cooling lubricants, lubricants and any adhering chips. As an option, the outside of the cylinder liner can be coated completely or partially.

BRIEF DESCRIPTION OF THE DRAWING

Non-restrictive aspects of the cylinder liner and method are described in the following and explained using the Figures in which.

DETAILED DESCRIPTION

Figure 1:
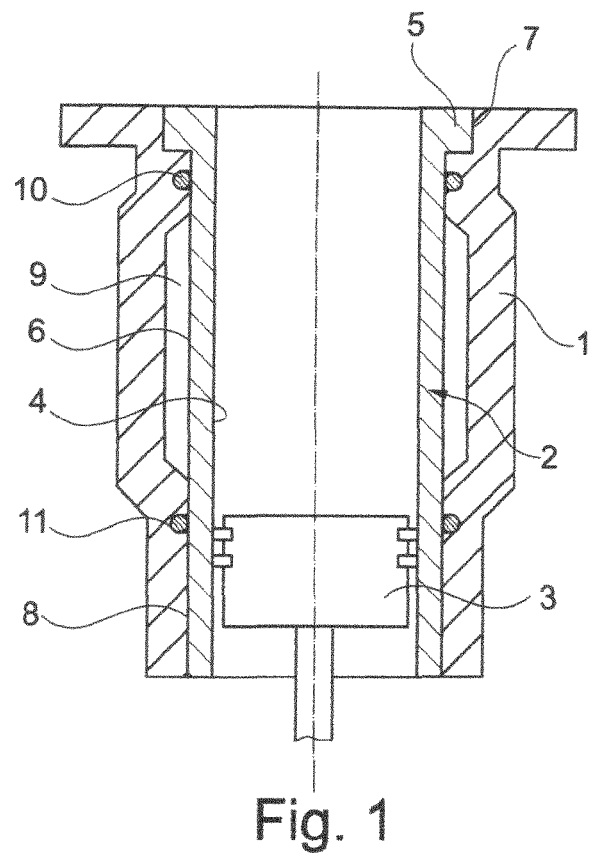
FIG. 1 shows a wet cylinder liner in the installed position in a sectioned view.
Figure 2:
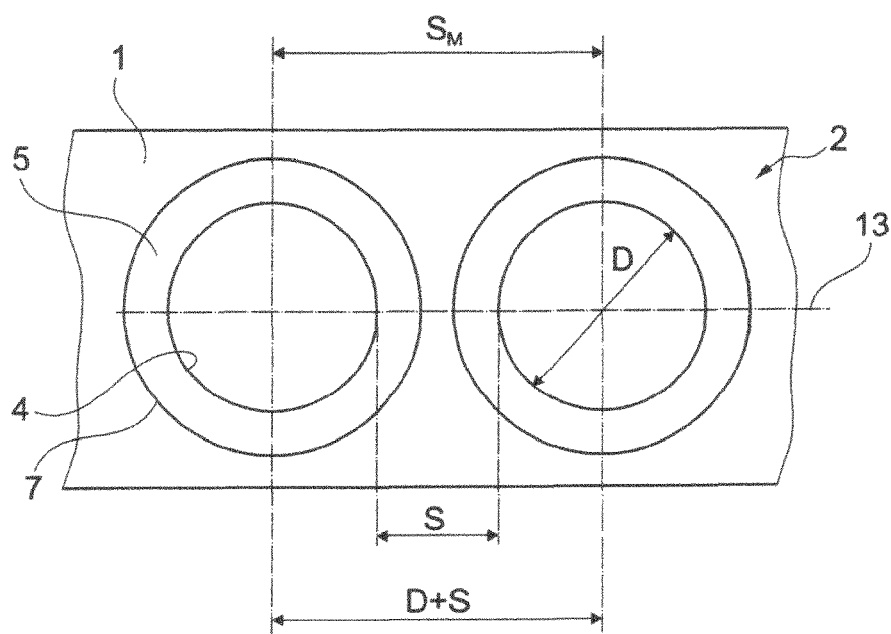
FIG. 2 shows a view onto a cylinder housing with two cylinder liners.

FIGS. 1 and 2 show the design construction and installation position of a known cylinder liner 2. In addition, FIG. 1 shows a section of a cylinder housing 1, designated as a cylinder housing, of an internal combustion engine which is not shown in more detail. The wet cylinder liner 2, around which coolant flows directly and in which a reciprocating piston 3 is guided on a running surface, is inserted in the cylinder housing 1. The cylinder liner 2 is fitted in a seat 7 or in a guide 8 of the cylinder housing 1 using a collar 5 and, axially offset thereto, via an outer side 6. Seal rings 10, 11 are provided for effective sealing of the coolant chamber 9 offset to the collar 5 and in the area of the guide 8. FIG. 2 shows two cylinder liners 2 located in the cylinder housing 1 along a longitudinal axis 13 of the cylinder housing 1, the distance between centers of which $S_M$ is found by adding the dimensions, diameter D and a distance S between the cylinder liners 2.

Figure 3:
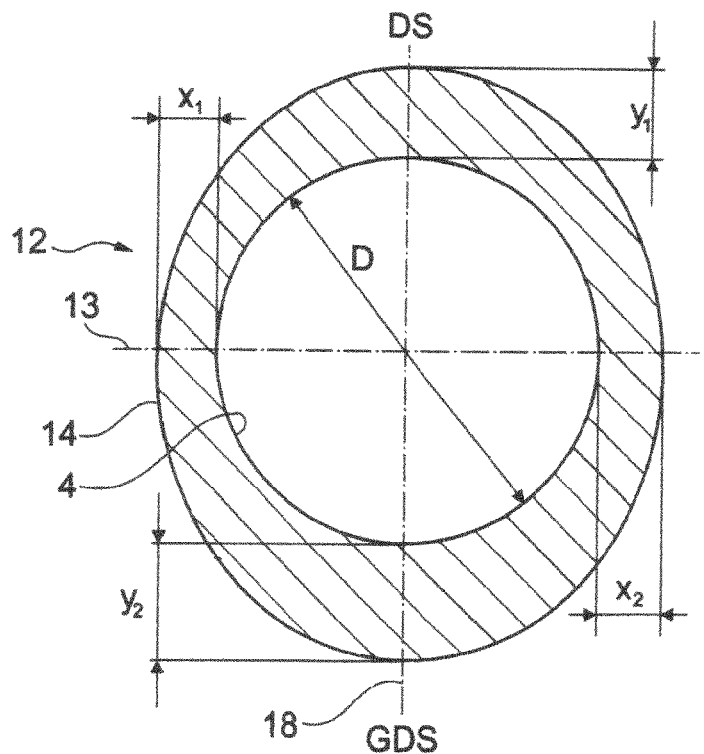
FIG. 3 shows a cylinder liner in a sectioned view.

FIG. 3 shows the functionally optimized cylinder liner 12 in cross-section with a rotationally asymmetrical outside 14 that deviates from a circular shape and can also be designated as a lateral surface. The oval shape of the outside can be executed in such a way that in all peripheral areas $x_1$, $x_2$, $y_1$, $y_2$ divergent wall thicknesses result that differ from the cylinder's inner bore, as can be seen from the following compilation: $x_1 \neq y_1$; $x_1 \neq x_2$; $x_1 \neq y_2$; $y_1 \neq x_1$; $y_1 \neq x_2$; $y_1 \neq y_2$; $x_2 \neq y_2$. Towards the pressure side and the counter-pressure side of the cylinder liner 12, which form an axis 18 running at a right angle to the longitudinal axis 13, wall thicknesses $y_1$, $y_2$ result that exceed wall thicknesses $x_1$, $x_2$ aligned to the longitudinal axis 13.

Figure 4:
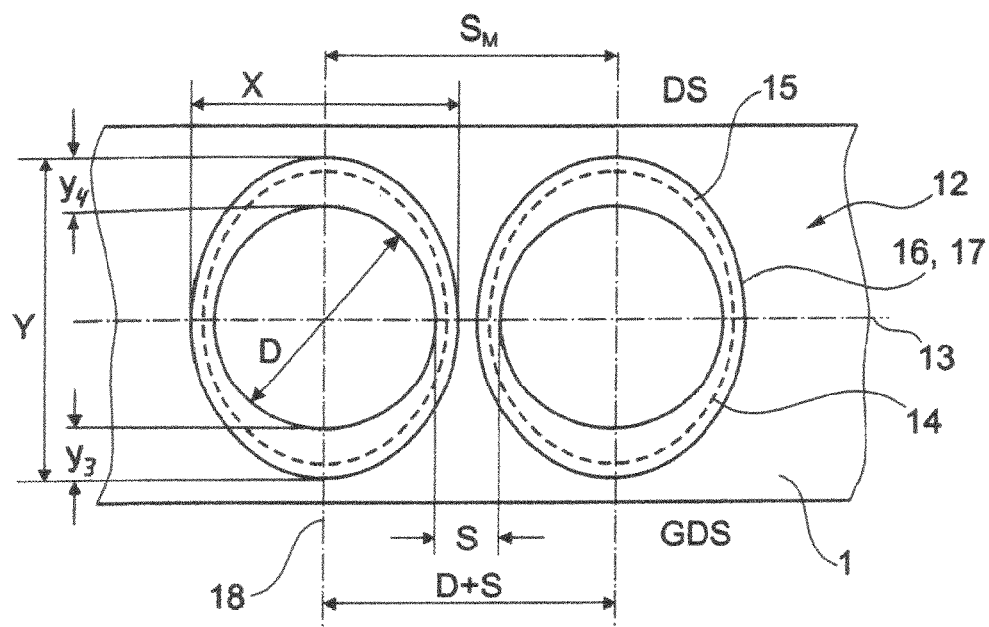
FIG. 4 shows cylinder liners with an off-round collar in the installed position.

FIG. 4 shows two cylinder liners 12 set in the cylinder housing 1, with the oval outer sides 14 indicated by a broken line. The similarly oval collar 15 overlapping the outside 14 of the cylinder liner 12 is fitted as a press fit with an outer contour 16 into a matching seat 17 of the cylinder housing 1. The resulting collar widths $Y_3+Y_4$ of the collar 15 along the axis 18 exceed collar widths that result along the longitudinal axis 13. The oval shape of the collar 15, whose y-dimension clearly exceeds its x-dimension, makes possible in comparison with FIG. 2 a reduced spacing dimension S between two cylinder liners 12 that consequently determines the distance between centers $S_M$ of cylinder liners 12 and simultaneously influences a structural length of the cylinder housing 1.

Figure 5:
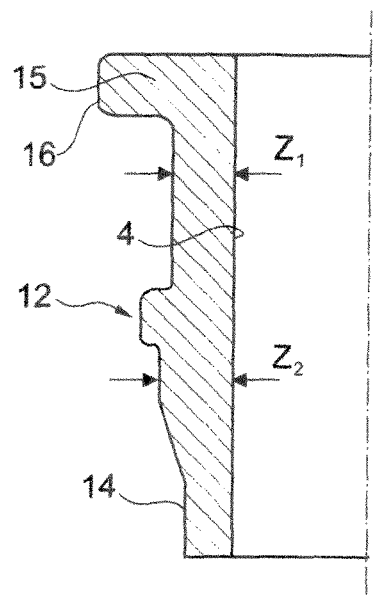
FIG. 5 shows the profile of the cylinder liner aligned to the counter-pressure side.
Figure 6:
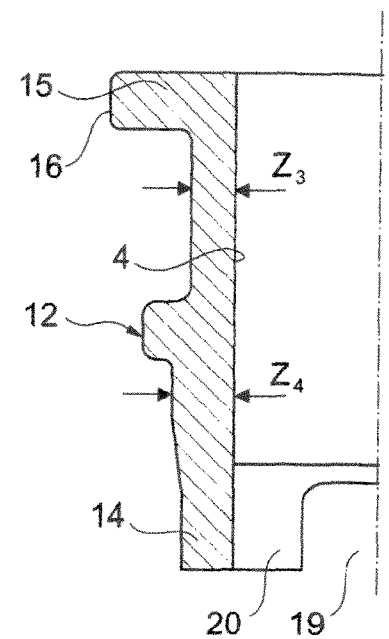
FIG. 6 shows the profile of the cylinder liner aligned to the pressure side.

FIGS. 5 and 6 show half a cross-section of the construction of the cylinder liner 12 that differ depending on their alignment. FIG. 5 shows the wall structure of the cylinder liner 12 aligned with the axis 18 and in FIG. 6 aligned with the longitudinal axis 13. Specifically to reduce the risk of cavitation, the wall thicknesses $z_1$, $z_2$ facing the pressure side and counter-pressure side (FIG. 5) exceed the wall thicknesses $z_3$, $z_4$ aligned to the longitudinal axis 13 (FIG. 6). As a supplement, it is appropriate for the exterior 14 of the cylinder liner 12 to have a partial coating that reduces the risk of cavitation. Starting from the collar 15, the wall thickness between zones $z_1$, $z_2$ in accordance with FIG. 5 and between zones $z_3$, $z_4$ in accordance with FIG. 6 can vary (for example, become thicker or thinner). The reduced wall thickness shown in this example in the thermally highly stressed zones $z_1$, $z_2$ promotes the cooling effect of the cylinder liner 12. As a measure to optimize costs and weight, the cylinder liner 12, as shown in FIG. 6, includes a recess 19 at the end facing away from the collar and an optional partially unmachined area 20 of the running surface 4 that extends from a zone corresponding to the BDC position of the bottom piston ring of the piston 3 to the end of the cylinder liner 12. Because the piston with the end of the skirt at BDC extends beyond the end of the liner, an unmachined area can only be located in the direction of the piston pin outside the piston skirt contact area so that this piston skirt contact area requires a machined, preferably honed liner surface.

Figure 7:
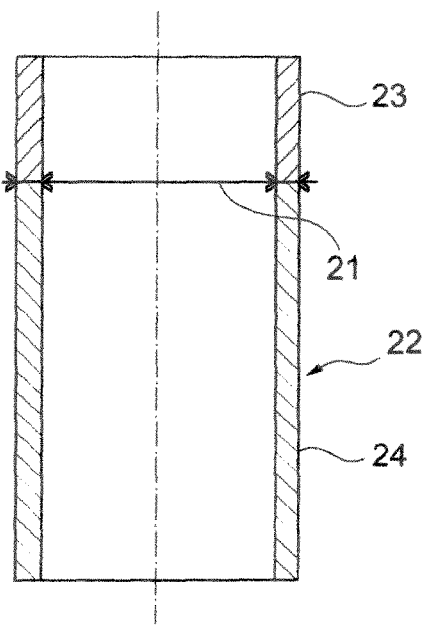
FIG. 7 shows a dry cylinder liner in a sectioned view.

FIG. 7 shows another functionally optimized cylinder liner 22 that, in the axial direction, includes two sections 23, 24 consisting of different materials which are materially joined into one unit. The sections 23, 24 supported over one joint plane 21 are preferably connected by friction welding. This design principle can be applied to both the dry cylinder liner 22 cast into the cylinder housing and to a wet cylinder liner.

Also conceivable is rotationally symmetrical centering in a corresponding rotationally symmetrical seat and a rotationally asymmetrical outer contour on the non-centering surfaces, e.g. surfaces bounded by water-jackets. The corresponding seat is necessary in the case of the asymmetrical collar, in all other cases the seat can be symmetrical. This means, as a supplement or alternative. for example, that an outer side 6 and/or an outer contour 16 of the collar 15 of the wet cylinder liner 12 is/are rotationally symmetrical and inserted aligned.

A further aspect can be seen in an aligned centering of the outside 6 and/or the outer contour 16 in a corresponding seat 7, 17 of the cylinder housing.

What is claimed is:

1. A cylinder liner for use in an internal combustion engine having a cylinder housing defining a cylinder having a piston stroke axis, a reciprocating piston positioned in the cylinder and a cylinder head, the cylinder liner comprising:
   a collar having a width and a rotationally asymmetric outer contour adapted to be positioned between the cylinder housing and the cylinder head, the collar outer contour adapted to be fitted in a matching seat in the cylinder housing; and
   a liner section connected to the collar and extending parallel to the piston stroke axis, the liner section having a top end adjacent the collar and a bottom end opposite the top end, the liner section defining a cylinder wall and a rotationally asymmetric outer side radially outwardly spaced from the cylinder wall defining a first liner wall thickness, an interior running surface for the piston and a rotationally asymmetric outer side, the liner adapted to be positioned in the cylinder between the cylinder housing and the piston, wherein the collar outer contour extends radially outward beyond the liner section outer side along the longitudinal axis, the liner section selectively includes a portion of the outer side positioned between the top end and the bottom end that is further radially spaced defining a second liner wall thickness greater than the first wall thickness.

2. The cylinder liner of claim 1 wherein the cylinder liner is a wet cylinder liner.

3. The cylinder liner from claim 1, wherein the outer contour of the collar of the cylinder liner has an oval, elliptical, prismatic free form or a geometry deviating from a circular shape.

4. The cylinder liner from claim 1, wherein divergent liner section first wall thicknesses (y1, y2) positioned towards a pressure side or a counter-pressure side of the cylinder liner that is greater than the first wall thicknesses (x1, x2) that are aligned along a longitudinal axis.

5. The cylinder liner from claim 1, wherein the collar of the cylinder liner forms divergent collar widths (y3, y4) towards a pressure side or a counter-pressure side that are greater than the collar widths aligned along a longitudinal axis.

6. The cylinder liner from claim 1, wherein in an area that lies below a bottom dead center (BDC) of a lowest piston ring of the piston towards a crankshaft and above the liner section bottom end the cylinder liner has a running surface for the piston on the inside only facing a pressure side and a counter-pressure side.

7. The cylinder liner from claim 1, wherein the liner section includes oppositely positioned recesses in the direction of a longitudinal axis of the cylinder housing.

8. The cylinder liner from claim 1, wherein the outer side of the liner section is coated at least locally, wherein the coating is a thermal spray coating operable to reduce cavitation.

9. A method for producing the outer side of a cylinder section of claim 1 wherein the portion of the outer surface further radially spaced comprises a plurality of portions positioned between the liner section top end and the bottom end, the method comprising: forming radially variably spaced geometrically shaped topographies on the outer side of the liner section.

10. The method for producing a cylinder liner of claim 9 further comprising:
producing a cylinder liner by a primary shaping process;
rotationally asymmetrically finishing the outer side of the liner section by off-round or oval turning thereby generating divergent wall thicknesses (y1, y2) towards a pressure side or a counter-pressure side of the liner section that exceed the wall thicknesses (x1, x2) that are aligned along a longitudinal axis;
final machining of the inner running surface of the liner section; and
cleaning the cylinder liner of cooling lubricant, lubricants and adhering chips.

11. The method from claim 10 further comprising:
coating of the outer side of the liner section, wherein the coating is a thermal spray coating operable to reduce cavitation.

12. The method of claim 10 further comprises:
production of the cylinder liner including a collar and at least two axial liner sections of the cylinder liner extending parallel to the piston stroke axis;
joining the axial liner sections using a positive material connection forming the cylinder liner; and
connecting the joined axial liner sections to the collar.

13. The method of claim 10 wherein the primary shaping process is one of a forging or casting process.

14. A cylinder liner for use in an internal combustion engine having a cylinder housing defining a cylinder and a reciprocating piston positioned in the cylinder in an axial direction, the cylinder liner comprising:
a radially extending collar portion having a rotationally asymmetric outer contour; and
at least two axially extending liner sections positioned along the axial direction materially joined to form one cylinder liner unit having a running surface adapted to guide the piston, one of the two axially extending liner sections connected to the collar at a top end of one of the two axial extending liner sections and a bottom end on the other one of the two axial extending liner sections opposite the top end, the cylinder liner fixed in the axial direction in the cylinder housing cylinder for use as one of a wet or a dry cylinder liner, the axially extending liner sections further having a rotationally asymmetric outer side positioned radially outward from the axial direction defining a first wall thickness and a selective portion of the outer surface positioned between the top end and the bottom end that is radially variable defining a second wall thickness that is one of greater or lesser than the first wall thickness.

15. The cylinder liner from claim 14, wherein the at least two axially extending liner sections joined to form the cylinder liner are produced from materials having one of different strengths or different temperature resistance.

16. The cylinder liner from claim 14, wherein divergent wall thicknesses (y1, y2) result towards a pressure side or a counter-pressure side of the cylinder liner that exceed the wall thicknesses (x1, x2) that are aligned along a longitudinal axis.

17. The cylinder liner from claim 14, wherein one of the axially extending liner extensions includes oppositely positioned recesses in the direction of a longitudinal axis of the cylinder housing.

18. The cylinder liner from claim 14 wherein at least a portion of the outer side of one of the liner extensions is coated at least locally, wherein the coating is a thermal spray coating operable to reduce cavitation.

19. A method for producing the outer side of the liner extensions of claim 14, wherein the selected portion of the outer surface radially variable comprises a plurality of portions positioned between the liner extension top end and the bottom end, the method comprising forming radially variable spaced geometrically shaped topographies on the outer side of the liner extensions.

20. A cylinder liner for use in an internal combustion engine having a cylinder housing defining a cylinder having a piston stroke axis, a reciprocating piston positioned in the cylinder, the cylinder liner comprising:
a collar having a variable width and a rotationally asymmetric outer contour, the width (y3,y4) positioned toward a pressure side or a counter-pressure side larger in respective width than the width positioned along a longitudinal axis; and
a liner section connected to the collar and extending parallel to the piston stroke axis, the liner section having a top end adjacent to the collar and a bottom end opposite the top end, the liner section having a cylinder wall and a rotationally asymmetric and radially outwardly variable outer side defining a first liner section wall thickness, the first wall thickness (y1,y2) positioned towards a pressure side or a counter-pressure side greater in thickness than the first wall thickness positioned along the longitudinal axis (x1,x2), the radially variable outer side further defining at least a second wall thickness different than the first wall thickness between the top end and the bottom end, wherein the collar outer contour extends radially outwardly beyond the liner section outer side over the entire collar outer contour.

21. The cylinder liner of claim 20 wherein the liner section comprises:
a first section and a second section positioned along the piston stroke axis, the first section connected at the top end to the collar, the first and the second sections materially joined to one another to form single cylinder liner section unit having a running surface adapted to guide the piston and each having the rotationally asymmetrical outer side.

* * * * *